United States Patent
Slat et al.

(10) Patent No.: US 6,641,774 B2
(45) Date of Patent: Nov. 4, 2003

(54) MULTILAYER PREFORM AND CONTAINER WITH CO-EXTRUDED LINER

(75) Inventors: William A. Slat, Brooklyn, MI (US); Richard C. Darr, Medina, OH (US)

(73) Assignee: Plastipak Packaging, Inc., Plymouth, MI (US)

( * ) Notice: Subject to any disclaimer, the term of this patent is extended or adjusted under 35 U.S.C. 154(b) by 0 days.

(21) Appl. No.: 10/292,643

(22) Filed: Nov. 12, 2002

(65) Prior Publication Data

US 2003/0091769 A1 May 15, 2003

Related U.S. Application Data

(62) Division of application No. 09/249,029, filed on Feb. 12, 1999, now Pat. No. 6,524,672.

(51) Int. Cl.[7] .......................... B29C 49/02; B29C 49/22
(52) U.S. Cl. ...................... 264/513; 264/515; 264/917; 264/921; 264/255
(58) Field of Search ................................ 264/513, 515, 264/255, 500, 917, 921

(56) References Cited

U.S. PATENT DOCUMENTS

| | | |
|---|---|---|
| 3,429,717 A | 2/1969 | Cook et al. |
| 4,041,209 A | 8/1977 | Scholle |
| 4,048,361 A | 9/1977 | Valyi |
| 4,536,409 A | 8/1985 | Farrell et al. |
| 4,702,966 A | 10/1987 | Farrell et al. |
| 5,021,515 A | 6/1991 | Cochran et al. |
| 5,049,624 A | 9/1991 | Adams et al. |
| 5,064,698 A | 11/1991 | Courtright et al. |
| 5,126,174 A | 6/1992 | Courtright et al. |
| 5,143,763 A | 9/1992 | Yamada et al. |
| 5,153,038 A | 10/1992 | Koyama et al. |
| 5,202,052 A | 4/1993 | Zenner et al. |
| 5,211,875 A | 5/1993 | Speer et al. |
| 5,227,411 A | 7/1993 | Holfeldt et al. |
| 5,246,753 A | 9/1993 | Koyama et al. |
| 5,281,360 A | 1/1994 | Hong et al. |
| 5,310,497 A | 5/1994 | Ve Speer et al. |
| 5,346,644 A | 9/1994 | Speer et al. |
| 5,364,555 A | 11/1994 | Zenner et al. |
| 5,399,289 A | 3/1995 | Speer et al. |
| 5,425,896 A | 6/1995 | Speer et al. |
| 5,492,742 A | 2/1996 | Zenner et al. |
| 5,492,947 A | 2/1996 | Wood et al. |
| 5,529,833 A | 6/1996 | Speer et al. |
| 5,605,996 A | 2/1997 | Chuu et al. |
| 5,627,239 A | 5/1997 | Ching et al. |
| 5,698,250 A | 12/1997 | DelDuca et al. |

(List continued on next page.)

Primary Examiner—Suzanne E. McDowell
(74) Attorney, Agent, or Firm—Rader, Fishman & Grauer PLLC (57) ABSTRACT

A preform for forming a hollow blow molded plastic container is provided with a closed base, a multilayer body-forming portion extending from the base, and an open neck portion that extends from the body portion. The body portion includes a co-extruded inner liner that includes (a) an innermost polymer layer, (b) at least one oxygen-scavenging layer, and (c) at least one high-oxygen barrier layer for retarding the migration of gases and moisture therethrough. An outermost layer is molded over the inner liner to form a preform. The liner and preform are formed so that the wall thickness of the individual layers can easily be varied along their lengths, however, at any given point along the length of the co-extruded liner (a) the wall thickness of the innermost polymer layer is less than 0.50 of the wall thickness of the inner liner and (b) the wall thickness of the inner liner is less than 0.25 of the total wall thickness of the preform body portion. Moreover, by the nature of the process, the innermost layer and the outer molded layer of the liner and the preform can be comprised of different polymer materials.

21 Claims, 5 Drawing Sheets

U.S. PATENT DOCUMENTS

| | | |
|---|---|---|
| 5,700,554 A | 12/1997 | Speer et al. |
| 5,736,616 A | 4/1998 | Ching et al. |
| 5,759,653 A | 6/1998 | Collette et al. |
| 5,759,654 A | 6/1998 | Cahill |
| 5,776,361 A | 7/1998 | Katsumoto et al. |
| 5,798,055 A | 8/1998 | Blinka et al. |
| 5,800,887 A | 9/1998 | Koyama |
| 5,804,016 A * | 9/1998 | Schmidt et al. ............. 156/242 |
| 5,804,236 A | 9/1998 | Frisk |
| 5,806,681 A | 9/1998 | Frisk |
| 5,811,027 A | 9/1998 | Speer et al. |
| 5,811,142 A | 9/1998 | DelDuca et al. |
| 5,830,545 A | 11/1998 | Frisk |
| 5,834,079 A | 11/1998 | Blinka et al. |
| 5,888,598 A | 3/1999 | Brewster et al. |
| 5,927,525 A | 7/1999 | Darr et al. |
| 5,952,066 A | 9/1999 | Schmidt et al. |
| 6,051,295 A | 4/2000 | Schloss et al. |

* cited by examiner

MULTILAYER PREFORM AND CONTAINER WITH CO-EXTRUDED LINER

This application is a Division of Ser. No. 09/249,029 filed Feb. 12, 1999 now U.S. Pat. No. 6,524,672.

TECHNICAL FIELD

The present invention relates to multilayer plastic preforms and containers with co-extruded liners having an oxygen scavenger layer, and a method for making such articles.

BACKGROUND ART

Many foods and beverages need protection from oxygen to maintain their quality and taste. Producers of such products seek packages that provide sufficient protection for longer-lasting taste and improved shelf life. Some common examples of oxygen-sensitive products include beer, citrus juices, and tomato-based products.

Oxygen can come into contact with the product content of plastic or polymer containers from one or more of several sources. First, oxygen can reside in the internal volume of the container, either as part of the filled product or as part of the "headspace" remaining above the product after filing. Second, oxygen from outside the container can permeate through the walls of the container or enter at the closure. Lastly, because oxygen resides naturally in plastic, once the container is filled it will release some of the resident oxygen and it will migrate to the inside of the container. Tests have shown that the latter source can have a very significant effect on the shelf-life of a product.

In the art of making plastic containers, various techniques have been employed to inhibit or prevent the ingress of exterior oxygen into the container and to scavenge the oxygen present inside the walls of the packaging. Several methods currently used to better regulate the exposure of the contents to oxygen incorporate different synthetic plastic resins having gas-absorbing capabilities into the structure of the packaging. The intention is that the layers of scavenging material will intercept and/or scavenge gases, such as oxygen, as their molecular compositions pass through the walls of the container and thereby protect the product therein.

In an effort to protect the oxygen-scavenging layer for the aforementioned use, some manufacturers of multilayered packages surround the oxygen-scavenging layer with one or more layers of known high-barrier materials. The high-barrier materials serve to reduce the oxygen transmission rate and to protect the oxygen-scavenging layer from premature activation.

However, in the production of bottles and containers that are used to package oxygen sensitive products, several practical issues are encountered. For instance, where foods, beverages, and other consumable items are involved, federal regulations often require that the innermost polymer layer that is in contact with the product contents must be approved for such use. In a number of cases, applicable regulations establish a minimum wall thickness for the innermost contact layer that must be maintained.

A notable disadvantage is encountered when conventional co-injection molding processes are used to form a preform that includes an oxygen-scavenging layer as part of an encapsulated core layer. In order for such a process to provide a preform with an innermost layer of FDA-approved material (e.g. virgin PET), the outermost layer of the co-injected structure will inherently consist of an equal thickness of the same material. In instances where a less expensive thermoplastic material (e.g. post consumer recycled PET) is available, placing such a corresponding thickness of the more expensive material on the outermost surface of the structure of a liner or preform, where it does not affect the contents, adds unnecessary expense.

Processes that produce a multilayer preform by injecting one layer of a thermoplastic material over the next can eliminate the aforementioned disadvantage of having the same thermoplastic material positioned on the innermost and outermost layers of the preform. However, such processes involve the use of multiple sets of costly rigid molds. Furthermore, because the molds are solid physical items, dimensionally variation of the wall thickness of the articles cannot be readily programmed or modified as it can be by an extrusion process.

Disclosure of the Invention

In light of the limitations of the prior art, some objects of the present invention are to provide improved multilayered oxygen-scavenging plastic preforms and resultant containers wherein:

(a) the structure includes a liner with a flexible layering scheme in which the innermost layer of the liner and outermost layer(s) of the liner and preform can be comprised of different materials;

(b) the wall thickness of individual layers of the various articles may be uniform or controllably varied along their lengths;

(c) oxygen scavengers and barrier materials are more effectively utilized;

(d) the quality and shelf-life of oxygen sensitive products is improved; and (e) the preforms and containers can be commercially produced in an efficient and cost effective manner with minimal additional capital investment.

In carrying out the above objects, a preform for forming a hollow blow molded plastic container is provided with a closed base, a multilayer body-forming portion extending from the base, and an open neck portion that extends from the body portion. The body portion includes a co-extruded inner liner that includes (a) an innermost polymer layer, (b) at least one oxygen-scavenging layer, and (c) at least one high-oxygen barrier layer for retarding the migration of gases and moisture therethrough. An outermost layer is molded over the inner liner to form a preform. The liner and preform are formed so that the wall thickness of the individual layers can easily be varied along their lengths, however, at any given point along the length of the co-extruded liner (a) the wall thickness of the innermost polymer layer is less than 0.50 of the wall thickness of the inner liner and (b) the wall thickness of the inner liner is less than 0.25 of the total wall thickness of the preform body portion. Moreover, by the nature of the process, the innermost layer and the outer molded layer of the liner and the preform can be comprised of different polymer materials.

BEST MODE FOR CARRYING OUT THE INVENTION

Figure 1:
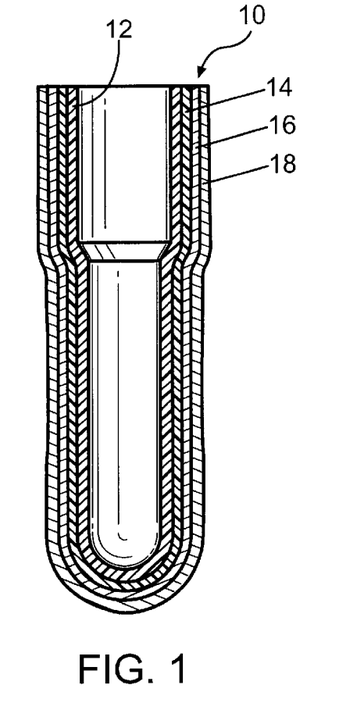
FIG. 1 is an elevational and cross-sectional view of a multilayer inner liner for a preform.

Referring now to the drawings in detail, wherein like reference numerals and letters designate like elements, there is shown in FIG. 1, an elevational view of a multilayered co-extruded inner liner, designated generally as 10. Although the inner liner 10 can be produced in a variety of ways, it is most preferably formed by either an extrusion-blow-molding or multilayer thermoforming process. Examples of processes that can be used to form such articles are described in U.S. Pat. Nos. 5,464,106 and 5,736,093, which are incorporated herein by reference.

The inner liner 10 is comprised of an innermost polymer layer 12, at least one oxygen-scavenging layer 16, and at least one high-oxygen barrier layer. When only one high-oxygen barrier layer is utilized, it may be positioned on either the inside or the outside of the oxygen-scavenging layer 16. However, in a number of applications it is desirable to position or "sandwich" the oxygen-scavenging layer between at least two barrier layers to protect the scavenging material from premature activation. FIG. 1 depicts such an embodiment in which the oxygen-scavenging layer 16 is positioned between an inner barrier layer 14 and an outer barrier layer 18. However, it is understood by those skilled in the art that additional inner and outer barrier layers are contemplated by the present invention. Moreover, there may be circumstances in which a plurality of oxygen-scavenging layers is utilized to further enhance oxygen-absorbing performance.

Figure 2:
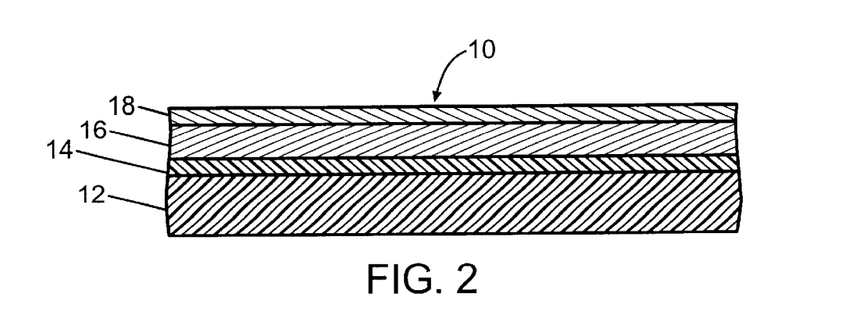
FIG. 2 is an enlarged cross-sectional view of the body-forming portion of a multilayered inner liner.
Figure 2A:
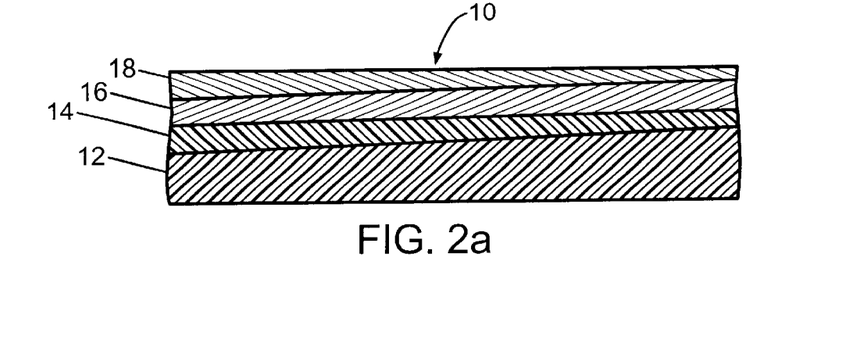
FIG. 2a is an example of an alternate enlarged cross-sectional view of the body-forming portion of a multilayered inner liner depicting several layers of varying thickness.
Figure 2B:
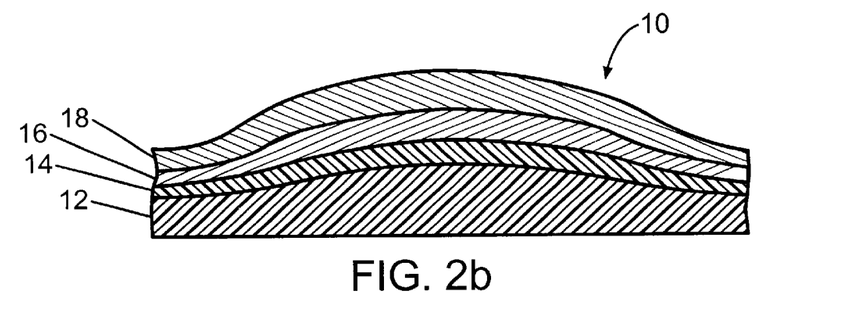
FIGS. 2b, 2c, 2d and 2e are other examples of enlarged cross-sectional views of the body-forming portion of a multilayered inner liner which depict several layers having varying thickness.
Figure 2C:
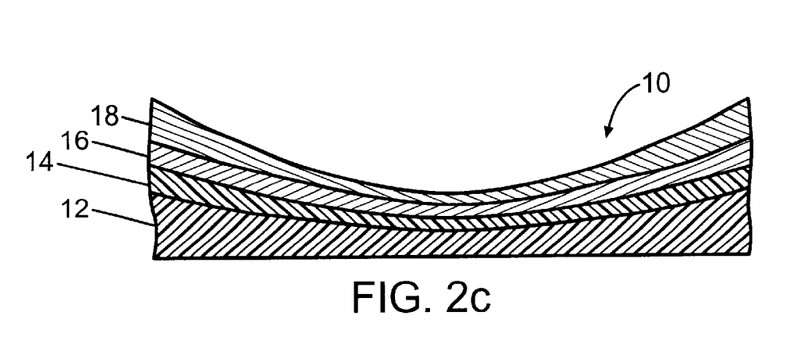
Figure 2D:
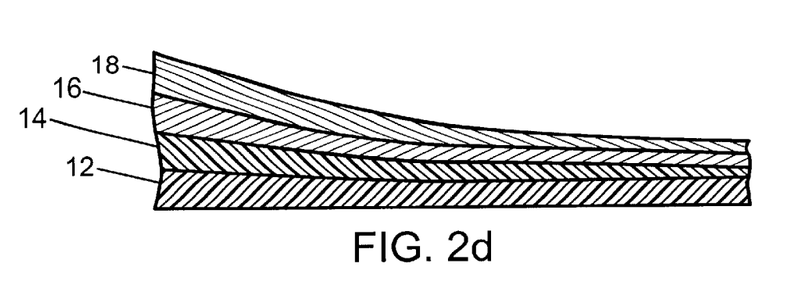
Figure 2E:
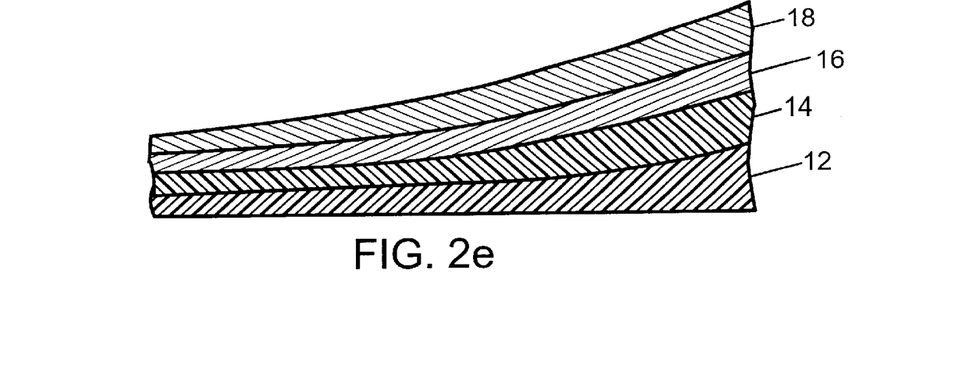

FIG. 2 illustrates a cross-sectional view of the wall section of a preferred embodiment of a multilayered inner liner 10 formed in accordance with the principles of the present invention. Although the wall thickness of the individual layers of the wall portion are shown as being generally uniform along their lengths, in practice, the wall thickness of the layers can easily be varied at any given point along their lengths. For instance, the wall thickness of a high-barrier layer (e.g., layers 14 and 18 in FIG. 2) can be constructed so that it is comparatively thicker at portions along the length of the liner where more barrier is desired and thinner in areas where less barrier may be needed.

Figure 2F:
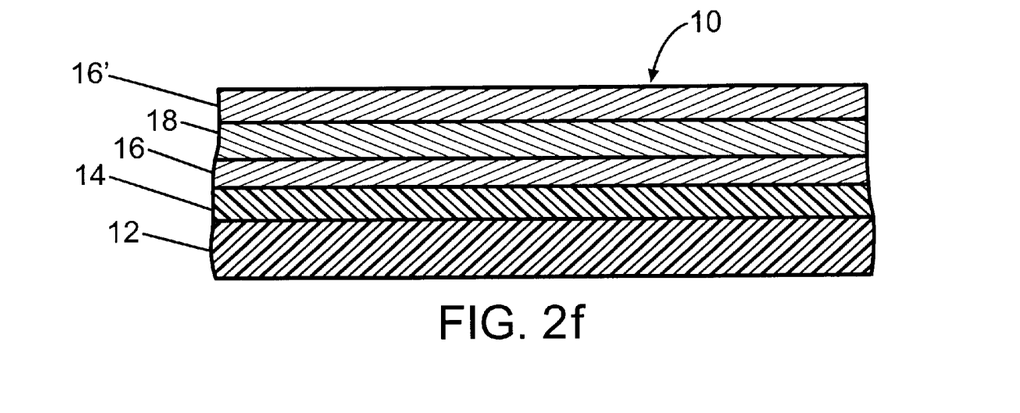
FIGS. 2f and 2g are illustrations of possible variations of the layering scheme of the body-forming portion taken as enlarged cross-sectional views thereof.
Figure 2G:
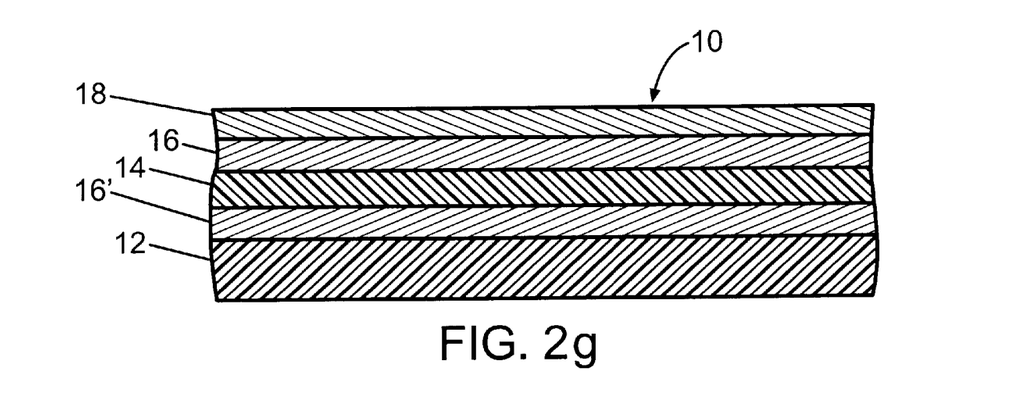

By variably controlling the wall thickness of the layers of the liner 10, materials can be more selectively and efficiently utilized over the length of the liner 10, often increasing performance and/or decreasing material costs. FIGS. 2a, 2b, 2c, 2d and 2e illustrate just some of the potential thickness variations (viewed as enlarged cross-sections of the body-forming portion) of the various layers of the inner liner 10. FIGS. 2f and 2g illustrate other possible embodiments of the inner liner 10 in which an additional oxygen-scavenging layer 16' is incorporated into the layering scheme. It is important to note that in instances in which more than one layer of an oxygen-scavenger or a high-barrier materials are utilized, the additional layers, whether oxygen-scavenging or high-barrier, can be different materials. For example, the high barrier layers 14, 16 depicted in FIGS. 2a through 2g may be comprised of entirely different barrier materials.

With continued reference to FIG. 2, the innermost layer 12 is comprised of a polymer material that is approved for contact with the intended contents of the container. Examples of materials that are acceptable for use as the innermost layer 12 for food products and beverages are polyethylene terephthalate (PET), polyethylene naphthalate (PEN), and combinations and/or blends of PET and PEN. Other examples of commonly used thermoplastic polymers that may be used to form the innermost layer 12 for non-consumable contents include high-density polyethylene (HDPE), polyvinylchloride (PVC), polypropylene (PP) and low-density polyethylene (LDPE). However, other polymer materials that are approved for contact with the intended contents can also be used.

The oxygen scavenger layer 16 may be comprised of any known oxygen scavenging composition which can structurally bond with the oxygen from the aforementioned sources and which is functionally compatible with the other layers of the liner 10. An example of a commercially available oxygen-scavenging material is a synthetic copolyester currently available from Amoco Chemicals called Amosorb® 3000. However, a number of other suitable oxygen-scavenging materials, including oxidizable polymers and polymers containing an anti-oxidant, are well known in the packaging art. In the practice of the current invention, the total oxygen scavenging material will comprise less than 0.10 by weight of the total composition of the resultant container, and will more preferably be in the range of 0.05 to 0.08.

The oxygen absorbing thermoplastic layer must be one that is compatible with the adjacent polymer layers such that the preform may be blow molded to form a container which exhibits substantial resistance to delamination. Thus, for example, when the adjacent layers are polyester, a polyester-based oxygen-scavenging layer is preferred. Other polymers which adhere sufficiently to adjacent polyester layers may be used, however, for example ethylene vinyl acetate, polyamides, and the like.

Examples of polymers which have been compounded to act as oxygen scavengers are those disclosed in U.S. Pat. Nos. 5,021,515; 5,034,252; 5,202,052; 5,399,289; 5,425,896; 5,700,554; 5,759,653; 5,776,361; and WO 90/00504; all incorporated herein by reference.

Polyamides, for example those ordinarily identified as MXD6, are suitable for use as an oxidizable thermoplastic. Transition metal catalysts such as cobalt naphthenates and cobalt neodecanoates may be incorporated to accelerate oxidation, for example at 10–2000 ppm, preferably 100–1000 ppm relative to the total film weight. The oxidizable polymer may comprise the only polymer in the layer, or may comprise only a portion of the layer. The amount can be tailored depending upon the amount of oxygen to be absorbed. Amounts of 1% by weight to 100% by weight (exclusive of metal catalyst) are suitable, for example. Compositions containing PET, MXD6, and 200 ppm cobalt as metal oxidation-promoting catalyst, are disclose in U.S. Pat. No. 5,021,515 which is incorporated herein by reference.

Polyesters, particularly copolyesters, and most preferably polyesters prepared from unsaturated monomers or comonomers such that they are easily oxidizable, particularly in the presence of transition metal compounds such as those of cobalt, are also useful. Unsaturated monomers which may be used to incorporate unsaturation into the polyester backbone are well known. Examples include itaconic acid, maleic acid, fumaric acid, their anhydrides, and other derivatives useful in forming polyesters. The unsaturated monomers are generally believed to be used in minor amounts, for example from 1 mol percent of the total of the same type of monomer. Thus, in PET, up to 40 mol percent or more of the terephthalic acid component may be replaced by maleic acid. Amounts of transition metal catalyst similar to the amounts used with oxidizable polyamides are suitable for promoting oxidation of the polyesters.

In general, polymer layers employing mixtures of zero valent metals (e.g., iron, powder) or of sulfur compounds, i.e., sulfites, bisulfites, thionites, etc. are less desirable, as the decomposition products may leach into the container contents, imparting an undesirable taste or smell.

The oxygen scavenging layer may also contain an effective amount of an organic antioxidant. Antioxidants which absorb oxygen by reacting with the oxygen are preferred. Many such antioxidants are commercially available, such as the various hindered phenols, e.g., BHT, hindered aromatic amines, and the like. Antioxidants such as citric acid, ascorbic acid, vitamin E, and like compounds are also useful. These compounds are preferably homogeneously dispersed in the polymer as a solution so as not to include any solid particles which could cause problems during extrusion or blow molding.

The high-barrier layer or layers 14, 18 used in connection with the present invention should also be functionally compatible with the other layers of the liner 10. Some examples of high-barrier materials include, but are not limited to, polyethylene naphthalate (PEN), polyvinylidene chloride, polyvinyl chloride, nylon (such as MXD-6), ethylene-vinyl alcohol (EVOH), polyvinyl alcohol (PVOH), polyacrilonitrile (PAN), liquid crystal polymer (LCP), and various combinations and blends of such materials.

As previously mentioned, it has been found in practice that a significant portion of the oxygen that eventually interacts with the product contents of the container comes from oxygen that resides naturally in the walls of the plastic container. Barrier layers help to retard the amount of oxygen moving past them to the contents, but the barrier layer or oxygen-scavenging layers are not typically the innermost layer of the container, nor are they usually entirely impermeable to the undesired oxygen—especially over extended periods of time.

To the extent practical, the present invention minimizes the thickness of the innermost layer 12 of the liner 10—so as to reduce the amount of retained oxygen available to react with the container contents. Moreover, at any given point along the length of the liner 10, the wall thickness of its innermost layer 12 (taken in perpendicular cross-section to its central axis) is less than 0.50 of the total wall thickness of the liner 10. In a number of applications, the wall thickness of the innermost layer 12 will preferably be less than 0.40 of the total wall thickness of the liner 10.

While a very thin liner having a wall thickness of less than 1 millimeter can theoretically be formed by the processing techniques previously mentioned in connection with this invention, governmental regulations may mandate that the innermost layer of a given material must have a specified wall thickness. For instance, in the case of virgin PET, a minimum wall thickness of 1 millimeter must currently be maintained in the walls of the resultant container when the contents include certain consumable products such as carbonated beverages or beer. Furthermore, when designing the composition and dimensions of the liner, it is important to take into account the fact that the liner will be stretched and thinned out during subsequent processing of the preform and resultant container.

When the oxygen-scavenging layer is the outer layer of the liner 10, such as the example shown in FIG. 2f, additional steps may be taken to reduce or prevent the amount of premature activation associated with the liner's exposure to ambient conditions. In those cases, the liner 10 can be bagged or stored in a non-oxygen environment promptly following formation or the liner 10 can be covered or coated with a thin layer to protect it from ambient conditions until such time as it is formed into a preform.

Figure 3:
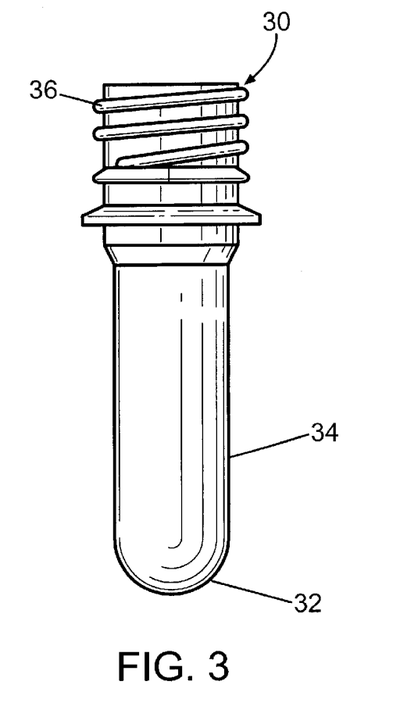
FIG. 3 is an elevational view of a multilayered preform that can be formed into a resultant container.

After the liner 10 has been formed, an outermost layer 40 is subsequently molded substantially adjacent the liner and co-extensive therewith to form a preform. While the outermost layer 40 can be formed from virgin material, it is more preferably comprised, at least in part, of less costly and/or recycled polymer material, such as post consumer recycled PET. The preform itself can have any number of shapes designed to effectively form the resultant container. FIG. 3 depicts a multilayer preform 30 of the type contemplated by this invention having a closed base 32, a multilayer body portion 34, and an open neck portion 36. Preferably, the molded outermost layer is injection molded over the liner 10 using conventional injection-molding equipment.

Figure 4:
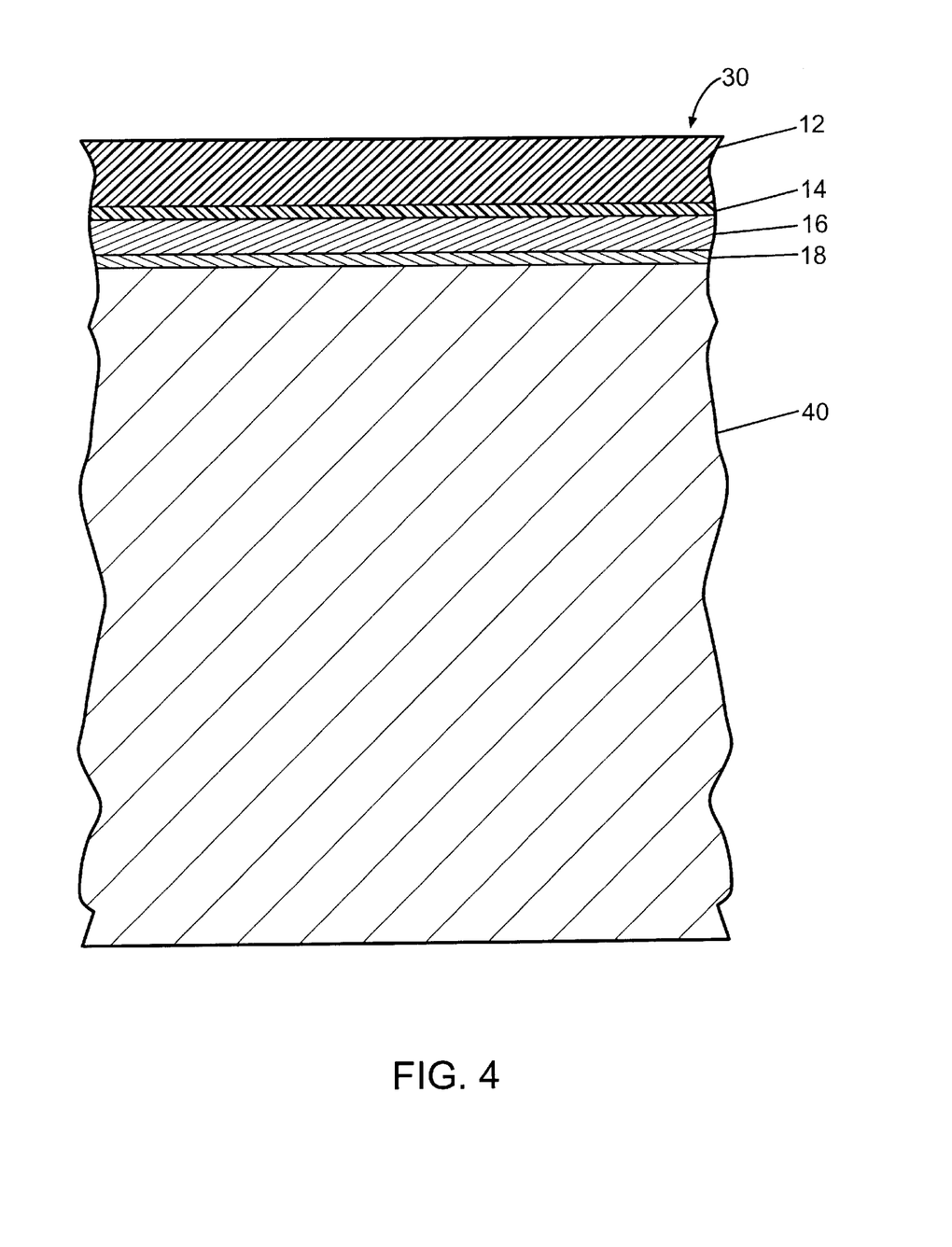
FIG. 4 is an enlarged cross sectional view of the body-forming portion of a multilayered preform.

At any given point along the length of the body portion 34, the wall thickness of the liner 10 (taken in perpendicular cross section to its central axis) is less than 0.25 of the total wall thickness of the body portion 34. In a number of applications, the wall thickness of the liner 10 will more preferably be in the range of 0.10 to 0.20 of the total wall thickness of the body portion 34 of the preform 30. FIG. 4 generally shows an enlarged cross sectional view of the body-forming portion of a multilayer preform 30, including a molded outermost layer 40.

Figure 5:
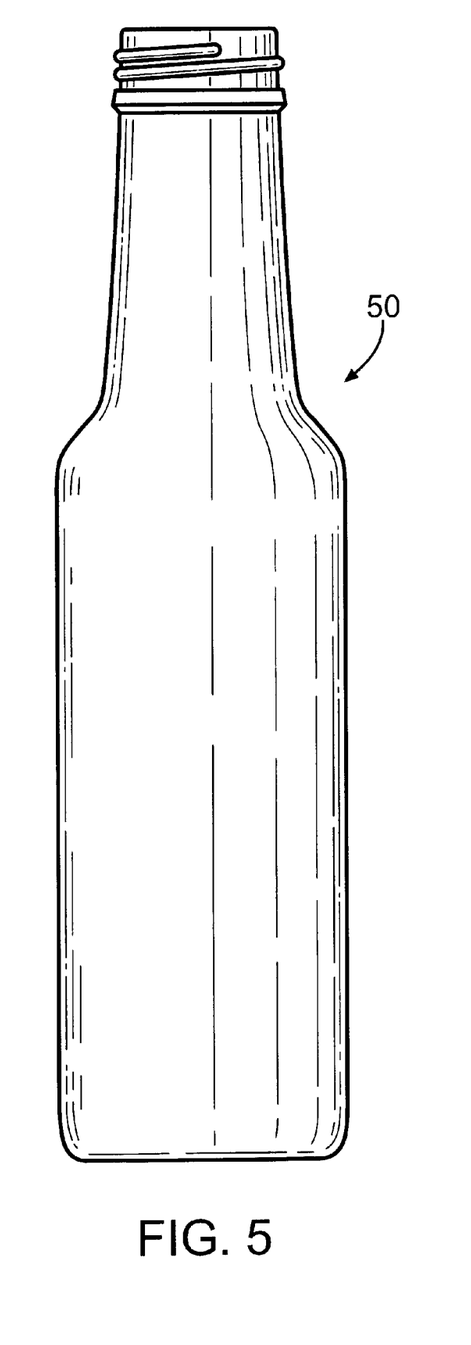
FIG. 5 is an elevational view of a container made in accordance with the principles of the current invention.

Some time thereafter, the multilayer preform 30 is formed into the resultant container. Preferably, the preform 30 will be transferred to a blow-molding machine and formed into a resultant blow molded container 50, such as that shown in FIG. 5. While one embodiment of the container is shown, it is important to keep in mind that the preform 30 can be blown into a number of shapes and configurations, limited primarily by the processing characteristics of the materials and the functional contours of the molds.

In a slightly different embodiment of the present invention, a preform for forming a hollow plastic container is provided with a closed base, a multilayered body portion extending from the base, and an open neck portion extending from the body portion. The multilayer body portion of this embodiment includes at least one polymer layer; at least one oxygen scavenger layer; and at least one high-oxygen barrier layer for retarding the migration of gases and moisture therethrough. The layering scheme of the body portion of the multilayer preform can resemble any of the variations previously described or shown in connection with the innermost liner and multilayered preform. However, to facilitate later separation of the constituent materials of the preform and/or the resultant blow molded container for recycling or similar purposes, at least one of the layers of the body portion of the multilayer preform (and hence the resultant container) will include an additive. Some of the possible additives that can be used include colorants, ultraviolet light inhibitors, and ultraviolet light absorbers, however, other conventional additives are also contemplated.

The preform of the instant embodiment is preferably formed through the process of forming a co-extruded inner liner and a molded outermost layer as previously described herein. However, the multilayered preform of the instant embodiment may instead be formed in any conventional manner.

Where colorants are used, they may serve the purpose of influencing product appearance in addition to aiding in the subsequent material separation process. Each layer may be comprised of a distinguishing color or instead present a clear appearance. For instance, the polymer layer might be comprised of clear PET while the oxygen scavenger layer and/or the high-oxygen barrier layer might include colorants that allow the color-containing material to be readily visible in the recycling stream. This is particularly useful for recycling operations that have color sorting and separating capabilities.

Furthermore, the inclusion of colorants or ultraviolet inhibitors or absorbers with the oxygen scavenger and/or high-oxygen barrier layers may also reduce or eliminate the amount of such materials, if any, to be included in the polymer layer(s) of the preform or container. In one particular embodiment, all of the colorants, ultraviolet inhibitors and/or absorbers can be concentrated in the oxygen scavenger and/or high barrier layers of the preform or container, so that the remaining uncolored polymer material can be more easily separated or recycled.

The two types of colorants most widely used to color plastics are pigments and dyes. A pigment is a colorant that is insoluble and is dispersed as discrete particles throughout a resin to obtain a color. A dye is an organic-based colorant that is soluble in a resin. Several items need to be addressed when selecting a colorant for a designated resin. The processing temperatures of the resins are important since many colorants will burn out if they are processed at too high a temperature. Also, some colorants are not chemically compatible with some resins and may bleed or change color. Light stability of a colorant can be a determining factor if the product is to be exposed to sunlight. Where the product is food or medicine, there may be restrictions on the types of colorants that can be used. For food-contact applications, heavy metal-free colorants or colorants that are sanctioned for use by organizations such as the FDA are preferred.

While the best modes for carrying out the invention have been described in detail, persons familiar with the art to which the invention relates will recognize various alternative ways of practicing the invention as described by the following claims.

What is claimed is:

1. A process which comprises:
    producing a hollow plastic preform with closed base, a multilayer body portion extending from the base, and an open neck portion extending from the body portion, including:
        co-extruding an inner liner to form at least a portion of the preform body portion having the following layers, an innermost polymer layer, at least one oxygen scavenger layer, and at least one high barrier layer for retarding the migration of gases and moisture therethrough;
        whereby at any given point along the length of the co-extruded liner the wall thickness of the innermost layer is less than 0.50 of the wall thickness of the inner liner, and the wall thickness of the inner liner is less than 0.25 of the total wall thickness of the preform body portion; and
        molding an outermost layer substantially adjacent the inner liner and co-extensive therewith, wherein the outermost layer is formed at least in part by injection or compression molding.

2. The process of claim 1, including the step of forming the innermost polymer layer of the liner from a different material than the remaining layers of the inner liner and the molded outermost layer.

3. The process of claim 1, including the step of varying the thickness of at least one of the layers of the inner liner along the length of the body portion.

4. The process of claim 1, wherein the high-barrier layer and the oxygen scavenger layer are separate layers.

5. The process of claim 1, including the step of including a post consumer recycled polymer as at least a portion of the outermost layer.

6. The process of claim 5, including the step of including a single high barrier layer and oxygen scavenger layer positioned on either side thereof as at least a portion of the body portion.

7. The process of claim 1, including the step of including a polymer material that is suitable for use with food products as at least a portion of the innermost polymer layer.

8. The process of claim 7, including the step of including a material selected from the group consisting of polyethylene terephthalate, polyethylene naphthalate, and a combination of blend of polyethylene terephthalate or polyethylene naphthalate as at least a portion of the innermost polymer layer.

9. The process of claim 1, including the step of including a material selected from the group consisting of an oxidizable polymer and a polymer containing an antioxidant, as at least a portion of the oxygen scavenging layer.

10. The process of claim 1, including the step of including a material selected from the group consisting of ethylene vinyl alcohol (EVOH), polyvinyl alcohol (PVOH), polyvinyl chloride (PVC), polyvinylidene (PVDC), polyethylene naphthalate (PEN), polyacrylonitrile (PAN), nylon, and liquid crystal polymer (LCP) as at least a portion of the high barrier layer.

11. A process which comprises:
    blow molding a hollow plastic preform including a preform body portion to produce a hollow plastic container having a closed base, a multilayer body portion extending from the base, and an open neck portion extending from the body portion, including:
        co-extruding an inner liner to form at least a portion of the preform body portion having the following layers, an innermost polymer layer, at least one oxygen scavenger layer, and at least one high barrier layer for retarding the migration of gases and moisture therethrough;
        whereby at any given point along the length of the co-extruded liner the wall thickness of the innermost layer is less than 0.50 of the wall thickness of the inner liner, and the wall thickness of the inner liner is less than 0.25 of the total wall thickness of the preform body portion; and
        molding an outermost layer substantially adjacent the inner liner and co-extensive therewith to form said preform, the outermost layer formed at least in part by injection or compression molding; and
        blow molding said preform to form said container.

12. The process of claim 11, including the step of forming the innermost polymer layer of the liner from a different material than the remaining layers of the inner liner and the molded outermost layer.

13. The process of claim 11, including the step of varying the thickness of at least one of the layers of the inner liner along the length of the body portion.

14. The process of claim 11, wherein the high-barrier layer and the oxygen scavenger layer are separate layers.

15. The process of claim 11, including the step of including a post consumer recycled polymer as at least a portion of the outermost layer.

16. The process of claim 15, including the step of including post consumer polyethylene terephthalate as at least a portion of the outermost layer.

17. The process of claim 11, including the step of including a polymer material that is suitable for use with food products as at least a portion of the innermost polymer layer.

18. The process of claim 17, including the step of including a material selected from the group consisting of polyethylene terephthalate, polyethylene naphthalate, and a combination or blend polyethylene terephthalate or polyethylene naphthalate as at least a portion of the innermost polymer layer.

19. The process of claim 11, including the step of including a material selected from the group consisting of an oxidizable polymer and a polymer containing an antioxidant, as at least a portion of the oxygen scavenger layer.

20. The process of claim 11, including the step of including a material selected from the group consisting of ethylene vinyl alcohol (EVOH), polyvinyl alcohol (PVOH), polyvinyl chloride (PVC), polyvinylidene (PVDC), polyethylene naphthalate (PEN), polyacrylonitrile (PAN), nylon, and liquid crystal polymer (LCP) as at least a portion of the high barrier layer.

21. A process which comprises:

producing a hollow plastic preform with closed base, a multilayer body portion extending from the base, and an open neck portion extending from the body portion, including:

co-extruding an inner liner to form at least a portion of the preform body portion having the following layers, an innermost polymer layer, at least one oxygen scavenger layer, and at least one high-barrier layer for retarding the migration of gases and moisture therethrough, whereby at any given point along the length of the co-extruded liner the wall thickness of the innermost layer is less than 0.50 of the wall thickness of the inner liner, and the wall thickness of the inner liner is less than 0.25 of the total wall thickness of the preform body portion; and molding an outermost layer substantially adjacent the inner liner and co-extensive therewith, wherein the innermost polymer layer of the liner is formed from a different material than both the outer layer of the inner liner and the molded outermost layer.

* * * * *